United States Patent [19]

Monigold et al.

[11] 4,239,153
[45] Dec. 16, 1980

[54] MULTIPLE TEMPERATURE ACTUATED FLUID-ELECTRIC CONTROL DEVICE

[75] Inventors: Larry E. Monigold; Ronald G. Cadwell, both of Cadillac, Mich.

[73] Assignee: Kysor Industrial Corporation, Cadillac, Mich.

[21] Appl. No.: 974,449

[22] Filed: Dec. 29, 1978

[51] Int. Cl.³ .............................................. G05D 23/12
[52] U.S. Cl. .................................... 236/86; 236/35.3; 337/407
[58] Field of Search .......................... 236/84, 86, 35.3; 337/407, 408; 251/77

[56] References Cited

U.S. PATENT DOCUMENTS

| Re. 26,840 | 3/1970 | Harvey | 236/86 |
|---|---|---|---|
| 3,451,651 | 6/1969 | Rood | 251/77 |
| 3,759,054 | 9/1973 | Graber | 62/183 |
| 3,759,056 | 9/1973 | Graber | 62/183 |
| 4,065,052 | 12/1977 | Ridenour | 236/35.3 X |

*Primary Examiner*—Albert J. Makay
*Assistant Examiner*—William E. Tapolcai, Jr.
*Attorney, Agent, or Firm*—Price, Heneveld, Huizenga & Cooper

[57] ABSTRACT

A temperature responsive control device achieving sequential control of functions for engine temperature control in response to engine temperature conditions, the first function being controlled by a fluid flow valve and the subsequent function or functions being controlled by an electrical switch means actuated via the valve.

6 Claims, 6 Drawing Figures

MULTIPLE TEMPERATURE ACTUATED FLUID-ELECTRIC CONTROL DEVICE

BACKGROUND OF THE INVENTION

This invention relates to a temperature responsive control device that sequentially controls functions by sequentially actuated fluid flow valve and electrical switching means in the device.

Vehicle engines, particularly truck engines, are highly sensitive to internal temperature conditions for optimum operational characteristics and exposure to potential overheating damage. Consequently, temperature responsive controls and alarms have been developed to regulate, monitor, and signal the driver relative to engine temperature conditions. Illustrative units are set forth in U.S. Pat. Nos. Re. 26,840, 3,613,041 and 3,853,269. The control valves in U.S. Pat. Nos. Re. 26,840 and 3,853,269 typically operate shutters of the type for example in U.S. Pat. No. 3,198,298 or air operated fan drives that govern air flow through the radiator. See also U.S. Pat. No. 3,759,056. The unit in U.S. Pat. No. 3,613,041 electrically activates an electromagnetic fan drive or an alarm or shuts down the engine in the event of overheating. The control valves respond at a lower temperature than the alarm or shut down devices. Sometimes only one of these devices is used on an engine. However, both types can be employed on the same engine by providing two or three ports in the engine for insertion of a pair or more of temperature responsive elements into the coolant jacket. In this event, efforts are made to carefully preset these independently functioning devices to try to minimize interference therebetween.

SUMMARY OF THE INVENTION

This invention supplies a control device that sequentially controls engine temperature regulators, first by fluid flow control, and then subsequently by electrical circuit control. Each step uses the same thermoresponsive temperature sensing element as an actuator. The same ball valve which is responsive to the temperature sensing element achieves fluid flow control and then causes activation of the electrical switch subassembly.

The ball valve includes a valve seat and a ball valve element shiftable by a slide pin to control fluid flow at the valve. The valve element then shifts a plunger that physically separates but operationally interconnects the fluid flow valve portion and the electrical switch portion of the device. The plunger causes one or more electrical contacts to be engageable with cooperatively arranged mating contacts supported by the body of the device.

DESCRIPTION OF THE PREFERRED EMBODIMENT

Figures 1, 2:
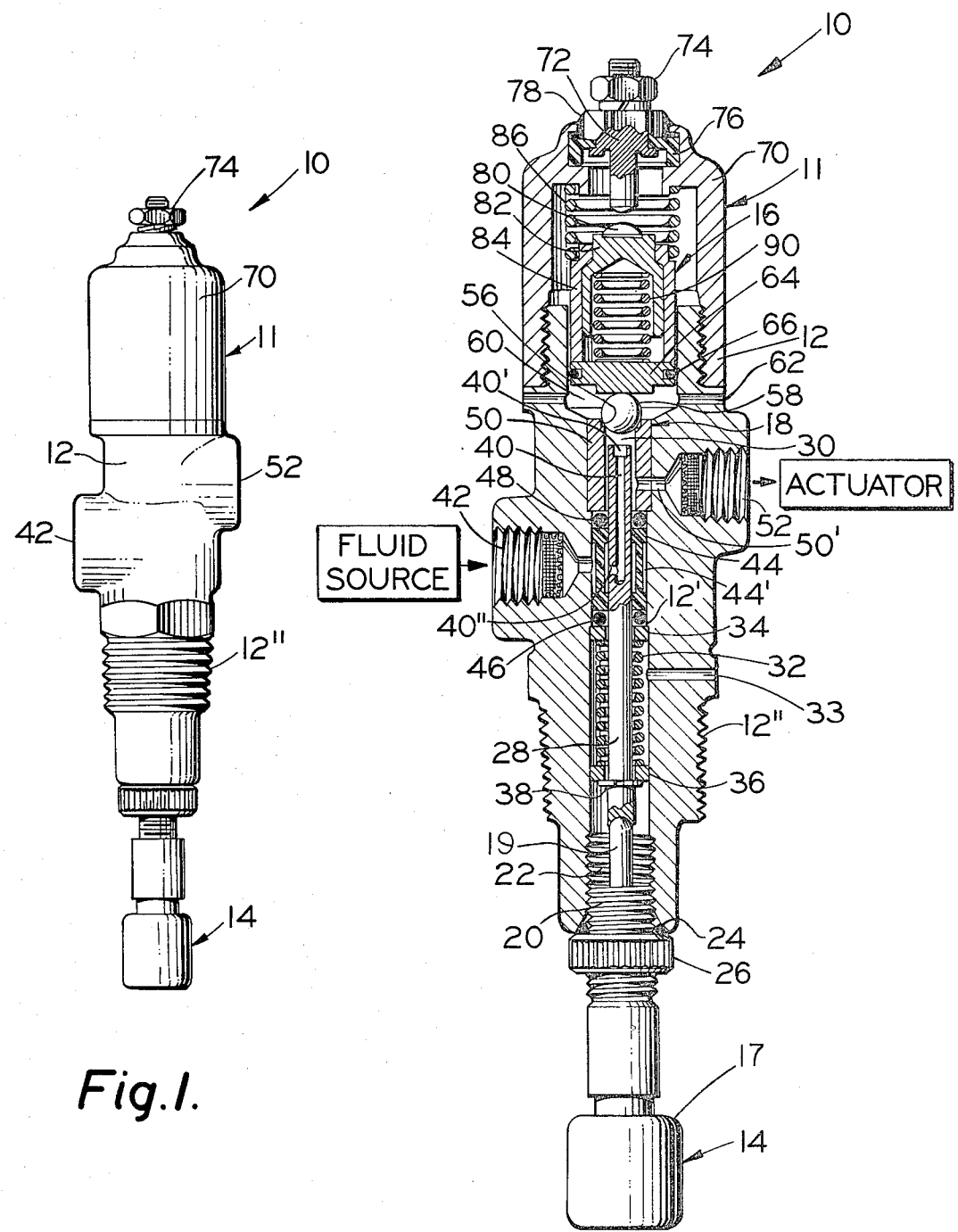
FIG. 1 is an elevational view of the first embodiment of the fluid-electric control device of this invention.
FIG. 2 is a sectional, elevational view of the device in FIG. 1.

Referring now specifically to the first embodiment depicted in FIGS. 1 and 2, the control device assembly 10 includes a housing assembly 11 having an elongated body 12 with an elongated opening therethrough, at one end of which is threadably mounted a thermoresponsive subassembly 14 which has operating mechanism extending into the body. At the other end of the housing is an electrical switch subassembly 16 within a housing cap 70 threadably attached at the end of the body. Within the body and intermediate the ends thereof is a fluid flow control valve subassembly 18.

Referring specifically to the thermoresponsive subassembly 14, it includes a sensor bulb 17 filled with a conventional thermoresponsive, i.e. thermoexpansion substance, generally fluid or semi-fluid material sealed in the bulb. It is in operational relationship with an axially shiftable elongated plunger 19 such that expansion of the substance with increasing temperatures at the bulb causes extension of plunger 19 further into body 12, while contraction of the substance causes plunger retraction. Male threads 20 on the sensor subassembly interconnect with female threads 22 of body 12 for interconnecting these components, the connection being sealed as by an O-ring 24 or the like. A lock nut 26 enables fixing the two components at a particular relationship to each other to control the limits of movement of plunger 19.

The end of plunger 19 opposite bulb 17 is convex and engages a concavity in the adjacent axial end of a push rod 28. This push rod extends into the flow passage 30 in the central portion of body 12. Push rod 28 is biased into engagement with plunger 19 by a compression coil spring 32 extending around the push rod and axially retained between a pair of spaced washers 34 and 36, washer 36 being fixed relative to push rod 28 by a snap ring, E-ring or the like 38, and washer 34 being retained in a specific position in body 12 by a shoulder 12'. A vent port 33 in body 12 extends between the body interior that contains spring 32 and the ambient atmosphere to prevent compression of the air with movement of push rod 28 and to vent any fluid leak to the atmosphere.

The inner end of push rod 28 is hollow to form a passage 40 communicable with passage 30 through a hollow nose 40' on the axial end of push rod 28 opposite the end engaging plunger 19. The opposite end of passage 40 has a lateral outlet port 40". Port 40" is communicable with a lateral fluid inlet port 42 in body 12, through a port 44' in annular sleeve 44 around push rod 28. Sleeve 44 is straddled by a pair of O-ring seals 46 and 48 on its ends, seal 46 abutting washer 34 and seal 48 being retained in position by a sleeve 50 fixed in body 12 and into which the end of plunger 40 may freely slide with clearance between the sleeve and plunger for fluid flow therebetween. Sleeve 50 has a port 50' which communicates with outlet port 52 in body 12. Port 52 has connecting threads for a conduit that communicates with an actuator, e.g. a shutter actuator for the engine or an air operated engine fan drive.

At the axial end of sleeve 50 opposite the end into which push rod 28 extends is a valve seat 56 which cooperates with a ball valve element 58 to form a valve. This ball valve element is located in a chamber 60 of body 12, selectively vented to the ambient atmosphere through a plurality of vents 62. Closing chamber 60 and positioned on the opposite side of ball valve element 58 from valve seat 56 is a plunger 64 having a peripheral seal such as an O-ring 66. This plunger forms a coupling mechanism between the valve assembly and the electrical switch subassembly 16, while sealingly separating the two.

The electrical switch subassembly 16 is retained in housing assembly 11 by cap 70 which is threadably secured to the body. In this first embodiment, cap 70 has an electrical contact element 72 fixedly retained therein and integral with a terminal 74 projecting above the cap, both retained in the cap by an electrical insulator 76 and a potting compound seal 78. The inner end of terminal 72 is axially aligned with a second electrical contact 80 mounted on an electrically conductive cup 82 axially slidable within and retained by a circumferentially surrounding sleeve 84. Sleeve 84 is retained in abutment with plunger 64 by a compression coil spring 86 axially retained between the closed axial end of cap 70 and sleeve 84. Cup 82 is biased away from plunger 64 by a second compression coil spring 90 retained therebetween, such spring having less compressive resistance than the larger spring 86. This second spring allows further movement of plunger 64 toward the electrical contacts after contacts 72 and 80 have engaged, thereby allowing over travel and preventing damage to the assembly during operation.

Electrical contact 80, by its association with the components, is in electrical ground relationship to the device 10 such that electrical current supplied to terminal 74 can be grounded to the vehicle engine through the pair of contacts and the body of the device when the device is threadably secured in a port in an engine block via threads 12".

In operation, the unit shown in the first embodiment FIGS. 1 and 2 is capable of sequentially controlling two engine temperature control mechanisms such as a pneumatically operated shutter actuator and subsequently, an electrically actuated indicator such as a light or buzzer, or an electrically actuated solenoid valve to control the engine fan drive or to control a pneumatically operated engine fan drive and subsequently an electrically actuated indicator. In use, the device 10 is secured by threads 12" into a threaded port in an engine block (not shown) such that thermoresponsive element 14, and particularly the sensor bulb 17 thereof, projects into the coolant jacket of the engine. When the engine coolant is at a relatively low temperature, plunger 19 will be retracted toward the bulb, such that compression spring 32 biases push rod 28 with its open nose 40' away from ball valve element 58 in the manner shown in FIG. 2. Under these conditions, a compressed gaseous fluid, e.g. air, entering port 42 from the fluid source flows through opening 44' in spool 44, through port 40" into passage 40 and out hollow nose 40', around the upper end of the push rod inside sleeve 50 to outlet port 50', and thence through port 52 to, for example, the shutter actuator to maintain the shutters closed on the radiator of the engine. Also, ball valve 58 will be in at rest position on its seat 56 to prevent the compressed air escaping through the vent ports 62. And, plunger 64 held in engagement with ball 58 by compression springs 90 and 86 will cause the contacts 72 and 80 of the switch to be separated as depicted, to prevent electrical current flow through the switch mechanism.

As the engine coolant temperature increases, the substance in bulb 17 expands, extending plunger 19 which shifts push rod 28 into the body until nose 40' is closed by engagement with ball 58. This prevents further compressed air flow to the actuator of the shutter or the engine fan drive. Slightly more sensor expansion with increasing engine temperature causes push rod 28 to lift ball 58 from its seat 56, allowing the compressed air in the shutter actuator to vent through ports 62. Thus, the shutter mechanism is allowed to open (typically under spring bias) to allow cool air to flow through the radiator for cooling the engine coolant. If engine temperature increases even with the shutter mechanism open, push rod 28 will push ball 58 still further, thereby shifting plunger 64 against compression spring 86 until ultimately electrical contacts 80 and 72 engage. This allows current flow from terminal 74 through the grounded housing, causing activation of a warning signal or activation of a solenoid valve to the clutch of the engine cooling fan. The fan is operated to increase air flow through the radiator to accelerate cooling. Further expansion of the sensor with increasing engine temperature does not damage the mechanism because inner spring 90 will compress with axial movement between elements 82 and 84.

Upon cooling of the engine, the mechanism will operate in reverse, first separating contacts 72 and 80 for shutting off the fan component or the like activated electrically through the switch subassembly, and then allowing ball valve element 58 to seat and close off vents 62 and retracting push rod 28 from ball 58 for compressed air flow to the shutter actuator to close the shutters at the radiator.

Using the novel apparatus, these two functions always occur sequentially, using the same temperature sensor, requiring only one port in the engine block, yet with a relatively simple unit.

Figure 4:
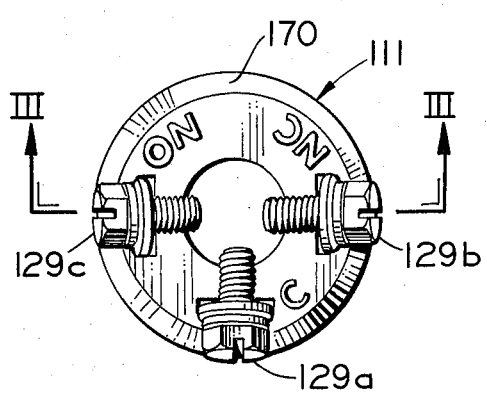
FIG. 4 is an end elevational view of the upper end of the device in FIG. 3.
Figure 3:
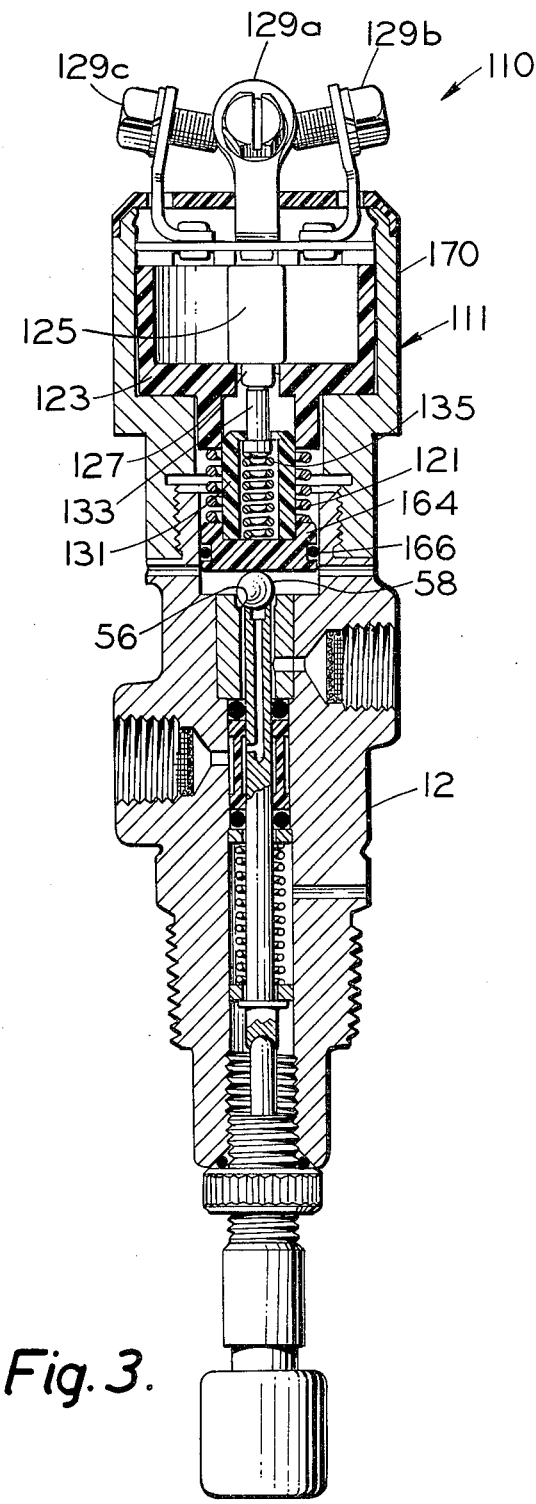
FIG. 3 is a sectional elevational view of the second embodiment of the fluid-electric control device of this invention.

In FIGS. 3 and 4 is depicted the second embodiment 110 of this invention. This embodiment corresponds in its components with the first embodiment relative to the sensor subassembly 14 and the fluid flow valve. It differs from the first embodiment from the plunger that engages the ball element through the electrical switch subassembly in the cap. Relative to the temperature sensor and the fluid flow valve components, like numbers refer to like parts in these first and second embodiments. The housing 111 has a cap 170 threaded to the body 12.

The internal plunger 164 that physically separates (but functionally interconnects) the valve and the electrical switch is slightly different in configuration than plunger 64 of the first embodiment, but basically alike in function. It also includes a seal 166 therearound to seal against flow or leakage between the valve and the switch portions. This plunger 164 is biased toward ball valve element 58 by a compression coil spring 121 axially retained between plunger 164 and a polymeric liner 123 that holds the switch subassembly 125. This switch subassembly may be of a typical butterfly-type switch, such as a micro switch, having a shiftable actuator 127 projecting from the switch housing. A plurality of terminals, here shown to be three in number at 129a, 129b, and 129c, extend from the switch through the end cap 170 which is threadably attached to body 12 of the valve. This switch mechanism thus includes a common terminal 129a, and a pair of cooperative terminals, one for a normally closed circuit and the other for a normally open circuit, for example. This enables two different functions to be actuated by the electrical switch mechanism when it is shifted. Shifting of the switch mechanism occurs with movement of plunger 164 toward the switch against the compression of spring 121. This causes movement of inner sleeve 131 within which is retained plunger pin 133. Pin 133 engages a second compression coil spring 135 which has less compressive resistance than spring 121.

Hence, during operation of the apparatus, engine temperature increase causes the valve mechanism to function like that described in detail relative to the first embodiment. Upon movement of ball valve element 58 off its seat 56, plunger 164 is shifted by the ball toward the switch, causing plunger pin 133 to shift switch actuator 127 to open a normally closed circuit and close a normally open circuit. If, after the switch is shifted, plunger 164 continues to move because of further increasing engine temperature, spring 135 will compress and accommodate the over travel to prevent damage to the switch.

Figure 6:
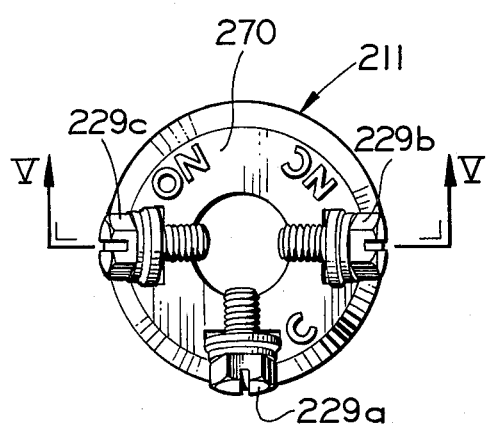
FIG. 6 is an end view of the upper end of the device in FIG. 5.
Figure 5:
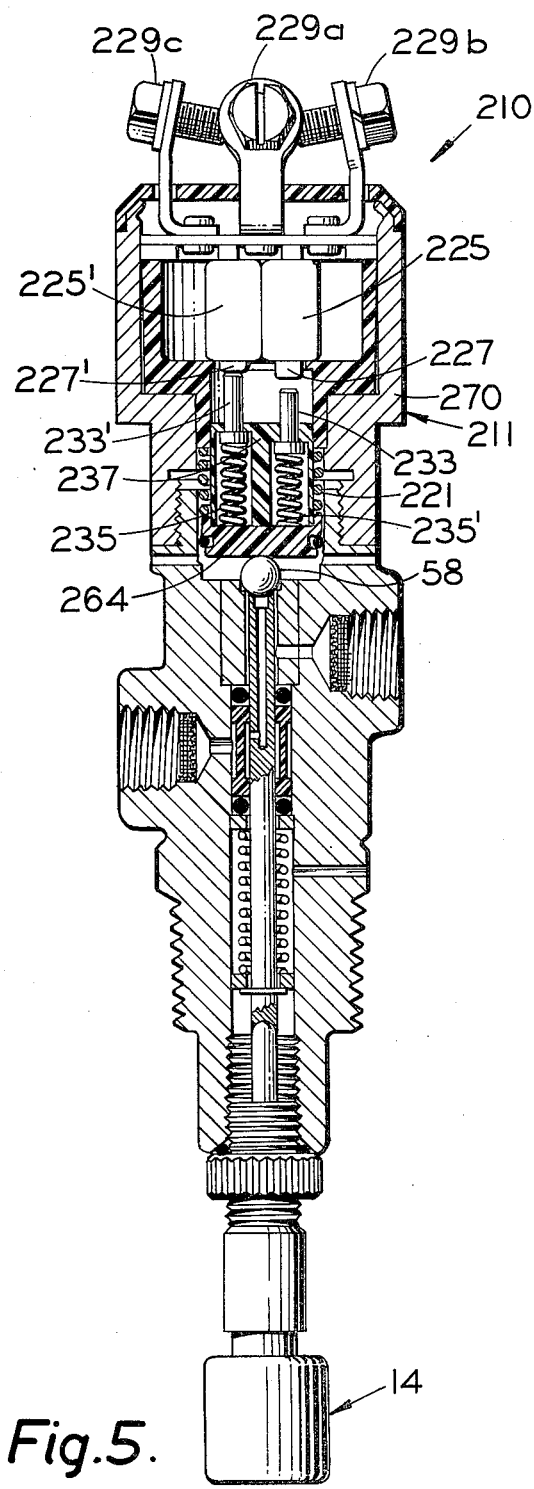
FIG. 5 is an elevational sectional view of the third embodiment of fluid-electric control device of this invention.

In the third embodiment depicted in FIGS. 5 and 6, again the temperature sensing mechanism and the fluid flow valve are like those in the first and second embodiments, with like numerals referring to like parts. In this embodiment 210, however, the electrical switch subassembly differs in that the pair of electrical switching functions are caused to occur sequentially rather than simultaneously as in the second embodiment. Specifically, the switch mechanism comprises switches 225 and 225' within the cap 270 of housing assembly 211. A pair of actuators 227 and 227' project therefrom and are aligned with a pair of plunger pins 233 and 233' respectively. These plunger pins are positioned side-by-side, retained within a double sleeve 237. In the axial direction of the device, i.e. in the direction the valve element and the plunger means move, these pins project different amounts so as to be spaced different amounts from the actuators 227 and 227' with which they cooperate respectively. Thus, switch actuator 227' is first engaged and actuated by plunger pin 233' with a predetermined movement of plunger movement, and only after the main plunger 264 shifts further does plunger pin 233 engage and actuate actuator 227. The plunger pins include compression coil springs 235 and 235' biasing them toward the switch actuator and compressible after the plunger pin engages an actuator for accommodating over travel to prevent damage to the structure with further expansion of the thermoresponsive element. Compression coil spring 221 is axially retained between plunger 264 and polymeric liner 223 that houses the switch subassembly. This spring biases the plunger toward the ball valve element 58.

Operation of the fluid flow control valve portion of this embodiment is like that set forth in detail in explanation of the first embodiment. And, when the ball valve element 58 shifts plunger 264 toward the switch subassembly, switch 225' will first be actuated by engagement of plunger pin 233' with actuator 227'. After further movement of plunger 264, with further expansion of the element 14, pin 233 engages actuator 227 to operate switch 225. These switches can have a common lead 229a, with one switch 225 being connected to lead 229b and the other switch 225' being connected to the lead 229c. During operation, as the engine temperature increases, the fluid flow valve first shifts to actuate the radiator shutter as previously explained. Then, with further heating and movement of plunger 264, switch 225' will close to actuate the radiator engine fan through a solenoid valve or the like. Finally, with further temperature increase and actuation of switch 225, an alarm can sound or appear indicating serious over-heating problems. Alternatively or additionally the last switch can automatically shut down the engine under these conditions.

The embodiments of the invention in which an exclusive property or privilege is claimed are defined as follows.

1. A temperature responsive control device having sequential fluid flow control and electrical circuit control functions comprising:
a body having a passage with a thermoexpansion element on one end thereof and a slide pin with an inner hollow nose in said passage, said slide pin being shiftable by said element; an inlet port and an outlet port communicant with said passage and with each other through said slide pin hollow nose; a ball valve in said passage including a valve seat and a ball valve element engageable by said slide pin nose to close said hollow nose and to also shift said ball valve element off said valve seat to open said ball valve; a vent port in said body communicable with said outlet port through said ball valve when said ball valve is open; an electrical switch subassembly on the opposite side of said ball valve from said slide pin, shiftable plunger means between said ball valve element and said electrical switch subassembly, shiftable toward the latter by shifting of said ball valve element off said valve seat, said plunger means comprising a plunger in engagement with said ball valve element, a sleeve extending toward said electrical switch subassembly, and at least one inner element telescopically fitted within said sleeve and movable therein, first spring means for biasing said plunger means away from said electrical switch subassembly and toward said ball valve element, so that shifting of said plunger means is against the bias of said first spring means to cause said inner element to actuate said electrical switch subassembly sequentially to the opening of said valve, whereby said control element causes sequential control of functions in response to increasing temperature, the first control step being directly by said ball valve, and the second control step being indirectly by said ball valve causing shifting of said switch subassembly, second spring means between said inner element and said plunger for biasing said inner element and plunger to a telescopically extended position relative to each other while allowing telescopic contraction thereof to accommodate overtravel movement of said plunger by said ball valve element, said first spring means having greater biasing force than said second spring means; and means for sealing said electrical switch subassembly within said body and from said ball valve and said passage.

2. The temperature responsive control device in claim 1 wherein said shiftable plunger means has a first electrical contact; and a second electrical contact aligned with said first contact to be engaged thereby when said first contact is shifted.

3. The device in claim 1 wherein said shiftable plunger means sealingly separates said valve from said electrical switch subassembly.

4. The device in claim 1 wherein said electrical switch subassembly includes two switches actuable by said ball valve.

5. The device in claim 4 wherein said switches are operable simultaneously by said ball valve.

6. The device in claim 4 wherein said switches are operable sequentially by said ball valve.

* * * * *